United States Patent Office 3,198,599
Patented Aug. 3, 1965

3,198,599
RECOVERY OF URANIUM AND/OR VANADIUM VALUES FROM ORES CONTAINING THE SAME
Clifford J. Lewis and William S. Dunn, Lakewood, Colo., assignors to Allied Chemical Corporation, New York, N.Y., a corporation of New York
No Drawing. Filed Sept. 15, 1961, Ser. No. 138,297
8 Claims. (Cl. 23—14.5)

This invention relates to a process for recovering uranium and/or vanadium values from ores containing the same. As used herein, we intend the term "ores" to include uranium and vanadium concentrates prepared from the ores in known manner.

In the recovery of uranium and/or vanadium values from their ores, physical upgrading procedures, such as simple scrubbing operations, flotation, air classification, heavy media separation and the like, are frequently adequate for producing the desired metal or metals in a form sufficiently pure for final separation thereof.

However, there are many ores which cannot economically yield the desired metal or metals by physical upgrading procedures. For example, the metal may be contained in a mineral in the ore, which mineral does not respond to physical treatment. Further, the mineral containing the metal may be present in such finely divided form that the entire matrix containing the mineral must be finely ground to liberate the mineral. In such case, subsequent physical upgrading procedures fail because of the fine particles involved.

Where reference is made below to the recovery of uranium values from ores, it should be understood that such reference is also applicable to the recovery of vanadium values therefrom.

Present commercial operations for the recovery of uranium values from its ores serve as excellent examples of situations in which the uranium mineral is too finely disseminated throughout the ore to permit physical upgrading of the uranium values. The uranium ores must first be leached with either alkaline or acid solutions to solubilize the uranium values. Extensive dewatering operation must then be used in order to separate the uranium pregnant leach solutions from the undissolved residues.

In typical operation, the ore is dissolved in an acid in order to solubilize the desired uranium values. Subsequently the uranium pregnant acid solution is separated from the gangue and undissolved residue by filtration, countercurrent decantation or other dewatering means. The uranium pregnant solution may then be processed by known routes leading finally to the recovery of the uranium metal in relatively concentrated and purified form.

Sulfuric acid is the most commonly used acid for the solubilization of uranium values present in ores. However, solubilization by sulfuric acid also has inherent economic and technical difficulties. Among these may be mentioned the problem which arises in connection with the separation of the gangue from the uranium pregnant solution since the ore may contain slimes or other material which render filtration or settling difficult. Also, since many ores contain calcium values, the formation of relatively insoluble calcium sulfate solids may result in bulky and difficult-to-handle gangue residues. Likewise the fact that much water is needed for the preparation of the sulfuric acid leaching solution, as well as for washing the uranium pregnant solution from the gangue, requires large leaching and settling and dewatering equipment.

As is well known to the art, the nitrate salts of uranium are relatively water-soluble and nitric acid is an excellent leaching agent for solubilizing uranium from its ores. However, because there are so many acid consumers other than uranium in such ores, the use of nitric acid for uranium ore leaching is generally uneconomical as compared with sulfuric acid for this purpose.

After uranium has been solubilized from ore containing it by an acid solution and the clarified uranium pregnant acid solution is finally obtained, it is conventional practice in the uranium milling industry to further concentrate the uranium values by either an ion exchange resin process or by a liquid-liquid extraction process. In cases where it is not possible to obtain a clarified solution, a resin-in-pulp process is used which comprises flowing the acid solution containing dissolved uranium and undissolved finely divided solids through ion exchange resins confined in turbulent condition in perforated containers. Liquid-liquid extraction cannot be used in conjunction with unclarified pulp slurry resulting from uranium leaching because the loss of organic extraction agent is excessive as the result of its absorption and entrainment by the pulp solids.

In the liquid-liquid extraction process, the uranium pregnant acid leach solution may be contacted with a water-immiscible organic phase consisting of an organo-phosphate, such as di-2-ethyl-hexyl-phosphoric acid, dissolved in kerosene. During this contact, the uranium leaves the aqueous leach solution phase and associates with the organo-phosphate in the organic phase. The two phases are then allowed to separate by virtue of their immiscibility. The uranium barren aqueous phase is usually discarded. The uranium pregnant organic phase is subsequently contacted by an aqueous stripping solution which, by reversal of the extraction process, removes the uranium into an aqueous product concentrate, while the organo-phosphate in the kerosene is simultaneously regenerated for recycle to the extraction operation.

It is the primary object of this invention to provide a simple and economical process for recovering uranium and/or vanadium values from ores containing the same.

Another object of this invention is to provide a simple and economical process for recovering uranium and/or vanadium values from ores containing the same in the presence of a controlled low amount of water.

Other objects and advantages will be apparent from the following disclosure and appended claims.

We have now discovered that nitrogen dioxide or liquid nitrogen tetroxide dissolved in a water-insoluble inert organic solvent will preferentially solubilize uranium and vanadium from ores containing the same in the presence of a controlled low amount of water. We have discovered further that a water-insoluble organo-phosphate dissolved in the organic solvent will simultaneously extract uranium and vanadium being solubilized from the ore. Using this fortuitous combination of nitrogen dioxide or liquid nitrogen tetroxide and organo-phosphate dissolved in organic solvent in the presence of a controlled low amount of water, we have found it possible to preferentially solubilize uranium and vanadium from its ores in a manner which permits a uranium and vanadium pregnant organic phase to be simultaneously formed and from which the uranium and vanadium can then be further recovered and the components of the organic phase recycled to the solubilizing-extracting operation.

Accordingly, the process of this invention involves recovering uranium and vanadium values from ores containing the same by contacting the ore with a solubilizing and extracting solution comprising a nitrogen oxide selected from the group consisting of nitrogen dioxide and liquid nitrogen tetroxide, a water-insoluble organo-phosphate and a water-insoluble inert organic solvent, the amount of nitrogen oxide in the solution being at least stoichiometrically equivalent to the uranium and vanadium values in the ore, in the presence of water in amount of about 1 to 6% by weight of the solution, and recovering said uranium and vanadium values from the solubilizing and extracting solution.

The solubilizing and extracting solution generally contains by weight about 1 to 5% nitrogen oxide, about 5 to 20% organo-phosphate and about 75 to 94% organic solvent. The amount of nitrogen oxide employed must be at least stoichiometrically equivalent to the uranium and vanadium values in the ore, and generally is adequate to produce a pH of about 0.5 to 2.0.

The use of a controlled low amount of water in the system is particularly critical. It has been found that use of water in amount of more than about 6% by weight of the extracting and solubilizing solution results in the solubilization of undesired metals, while efficient solubilization of the uranium and vanadium values is not obtained using less than about 1% by weight of water. Outstanding results have been obtained when the amount of water constitutes about 3 to 6% by weight of the extracting and solubilizing solution.

Suitable water-insoluble organo-phosphates include mono and dialkyl esters of phosphoric acids, such as those derived from monohydric alcohols of the general formula

R—OH wherein R is a radical selected from the group consisting of primary and secondary alkyl radicals having from 8 to 10 carbon atoms, such as 2-ethyl hexanol, n-octanol, primary decyl alcohol and isodecanol. The organo-phosphate is employed in amount at least sufficient to extract the solubilized uranium and vanadium values.

Any water-insoluble inert organic solvent may be used in the present process, including halogenated hydrocarbons such as carbon tetrachloride. Other suitable solvents include kerosene, benzene and ketones. These materials must be miscible with the nitrogen oxide and organo-phosphate and must be chemically inert in the system. The solvent is generally employed in amount about 5 to 20 times the weight of the organo-phosphate.

The range of temperatures maintained during the solubilizing-extracting procedure generally extends from about 0° to 20° C., with temperatures in the range between about 10° to 20° C. being preferred. Contact times of about 1 to 5 hours are usually sufficient for high recovery of the desired metals.

The uranium and vanadium values may be recovered from the solubilizing and extracting solution by separating the solution from the ore residue, as by filtration, and then distilling off the organic material. However, it is preferred to recover the uranium and vanadium values by use of a stripping agent. First the solubilizing and extracting solution is distilled to recover nitrogen dioxide or nitrogen tetroxide and some of the solvent for recycle. The remainder of the solvent system is then contacted with a stripping agent, such as a concentrated mineral acid (e.g. sulfuric or hydrochloric acid), or an alkali, such as a solution of sodium or ammonium carbonate, thereby removing the uranium and vanadium metals in an aqueous concentrate. The stripping solution must be sufficiently acid or alkaline to bring about reversal of the metal exchange while simultaneously liberating or regenerating the organic phase for recycle. The aqueous concentrate may then be separated from the organic phase to obtain the desired uranium and vanadium metals.

The process of this invention possesses many advantages over prior art procedures. In particular, the process avoids the use of relatively large amounts of water normally employed in the leaching of ores with acids, and, hence, eliminates the problem of dewatering. In addition, preferential solubilization and extraction of uranium and/or vanadium values may be accomplished in a single operation. Still further, there is provided a completely miscible solubilizing-extracting system from which unreacted nitrogen oxide can be simply and completely distilled for reuse. Moreover, the process makes it possible to apply liquid-liquid extraction processes to pulp slurries.

The following example, in which parts are by weight, is illustrative of the process of this invention.

Three samples of uranium ore were ground to approximately 28 mesh, and 100 parts of each sample were placed in a suitable vessel. The samples analyzed as follows:

|  | Percent $U_3O_8$ | Percent $V_2O_5$ |
| --- | --- | --- |
| Sample No. 1—Colorado Plateau Ore | 2.02 | 4.91 |
| Sample No. 2—New Mexico Ore | 0.431 | 0.91 |
| Sample No. 3—Front Range Ore | 0.222 | 0.009 |

Three batches of solubilizing-extracting solution were prepared consisting of about 89 parts of carbon tetrachloride, about 5 parts of di-2-ethyl-hexyl-phosphoric acid and about 1 part of liquid nitrogen tetroxide, in which about 5 parts of water were incorporated. This solution was added to each of the 100 part samples of ore, and each system was stirred at room temperature for one hour. The systems were then filtered on Büchner funnels and the residues were washed with carbon tetrachloride to remove entrained nitrogen tetroxide and organo-phosphate metal complexes. The residues obtained by evaporating the filtrates analyzed as follows:

|  | $U_3O_8$ (Part) | $V_2O_5$ (Part) |
| --- | --- | --- |
| Sample #1 | 0.5 | 0.927 |
| Sample #2 | 0.1 | 0.137 |
| Sample #3 | 0.045 | 0.001 |

From the foregoing analyses, the amounts of uranium and vanadium extracted from the samples are as follows:

|  | Percent $U_3O_8$ | Percent $V_2O_5$ |
| --- | --- | --- |
| Sample #1 | 24.9 | 18.9 |
| Sample #2 | 22.5 | 15.1 |
| Sample #3 | 20.3 | 11.1 |

While in the foregoing specification there have been described preferred embodiments of the present invention, modifications may be made therein without departing from the spirit of the invention and it is intended to cover all such as fall within the scope of the appended claims.

We claim:
1. A process for recovering uranium and vanadium values from an ore containing the same which comprises contacting the ore with a solubilizing and extracting solution comprising a nitrogen oxide selected from the group consisting of nitrogen dioxide and liquid nitrogen tetroxide, a water-insoluble organo-phosphate and a water-insoluble inert organic solvent, the amount of nitrogen oxide in the solution being at least stoichiometrically equivalent to the uranium and vanadium values present in the ore, in the presence of water in amount of about 1 to 6% by weight of the solubilizing and extracting solution at temperature of about 0° to 20° C., and recovering said uranium and vanadium values from the solubilizing and extracting solution.

2. The process of claim 1 wherein the amount of water is about 3 to 6% by weight of the solubilizing and extracting solution.

3. The process of claim 2 wherein the solubilizing and extracting solution comprises about 1 to 5% by weight of nitrogen oxide, about 5 to 20% by weight of organo-phosphate and about 75 to 94% by weight of organic solvent.

4. The process of claim 3 wherein the nitrogen oxide is liquid nitrogen tetroxide.

5. The process of claim 4 wherein uranium values are recovered from an ore containing the same.

6. The process of claim 4 wherein vanadium values are recovered from an ore containing the same.

7. The process of claim 5 wherein the organo-phosphate is di-2-ethyl-hexyl-phosphoric acid and the organic solvent is carbon tetrachloride.

8. The process of claim 6 wherein the organo-phosphate is di-2-ethyl-hexyl-phosphoric acid and the organic solvent is carbon tetrachloride.

References Cited by the Examiner

UNITED STATES PATENTS

| | | | |
|---|---|---|---|
| 2,860,031 | 11/58 | Grinstead | 23—14.5 |
| 2,869,980 | 1/59 | Grinstead | 23—14.5 |

FOREIGN PATENTS 569,322   1/59   Belgium.

OTHER REFERENCES

AEC Document ORNL, 1903, pp. 1, 2 and 7, July 6, 1955, declassified Aug. 9, 1956.

Clegg et al.: "Uranium Ore Processing," pp. 265, 270 (1958), Addison-Wesley Publishing Co., Inc., TN 490.U7C55.

Sidgwick: "Chemical Elements and Their Compounds," Vol. I, pp. 688, 689 (1950), University Press, Oxford. QD466S5.

CARL D. QUARFORTH, *Primary Examiner.*